(12) United States Patent
Gregg (10) Patent No.: US 6,984,994 B2
(45) Date of Patent: Jan. 10, 2006

(54) POSITION AND ELECTROMAGNETIC FIELD SENSOR

(75) Inventor: John Francis Gregg, Oxford (GB)

(73) Assignee: ISIS Innovation Limited, Oxford (GB)

( * ) Notice: Subject to any disclaimer, the term of this patent is extended or adjusted under 35 U.S.C. 154(b) by 11 days.

(21) Appl. No.: 10/221,543

(22) PCT Filed: Mar. 13, 2001

(86) PCT No.: PCT/GB01/01085

§ 371 (c)(1),
(2), (4) Date: Jan. 16, 2003

(87) PCT Pub. No.: WO01/69168

PCT Pub. Date: Sep. 20, 2001

(65) Prior Publication Data

US 2003/0179000 A1 Sep. 25, 2003

(30) Foreign Application Priority Data

Mar. 14, 2000 (GB) .............................. 0006144

(51) Int. Cl.
*G01R 27/28* (2006.01)
*G01N 27/76* (2006.01)

(52) U.S. Cl. .................. 324/655; 324/236; 324/207.26
(58) Field of Classification Search ................ 324/661, 324/668, 682, 650, 652, 653, 236, 263, 207.11, 324/207.13, 207.15, 207.21, 207.22, 207.23, 324/207.24, 207.25, 207.26, 655

See application file for complete search history.

(56) References Cited

U.S. PATENT DOCUMENTS

| 4,112,365 A | | 9/1978 | Larson et al. | |
|---|---|---|---|---|
| 4,791,355 A | * | 12/1988 | Coulter et al. | ............. 324/71.1 |
| 4,914,610 A | | 4/1990 | Shimizu et al. | |
| 5,065,093 A | * | 11/1991 | Nauta et al. | ............ 324/207.12 |
| 5,166,679 A | * | 11/1992 | Vranish et al. | ........ 340/870.37 |

(Continued)

FOREIGN PATENT DOCUMENTS

| EP | 0339983 A2 | 11/1989 |
|---|---|---|
| EP | 0684454 A1 | 5/1994 |
| EP | 0769699 A1 | 4/1997 |
| GB | 1510034 | 5/1978 |
| GB | 1530358 | 10/1978 |

(Continued)

OTHER PUBLICATIONS

Hahle–F, "Frequency–analogue strain measurement", Radio–Fernsehen–Elektronik (East Germany), vol. 33, No. 4, p. 223–5, Apr. 1984. (abstract attached).*

Hahnemann–H, "Capacitive volume measurement of conductive liquids", Radio–Fernsehen–Elektronik (East Germany), vol. 34, No. 8, p. 493–5, Aug. 1985. (abstract attached).*

(Continued)

*Primary Examiner*—Anjan Deb
(74) *Attorney, Agent, or Firm*—Wolf, Greennfield & Sacks, P.C.

(57) ABSTRACT

A position and electromagnetic field sensor is provided. The sensor relies upon an oscillator such as a Robinson marginal oscillator to generate an rf or microwave electromagnetic field. As an inhomogeneously shaped object, such as a metallic toothed wheel, for example, moves through the resultant field, the field experiences a change in electric or magnetic susceptibility. This in turn causes energy losses in the oscillator the magnitude of which can be output as a d.c. signal related thereto. To detect non-moving objects which nevertheless generate an electromagnetic field or have attached to them a source thereof, the sensor also includes a giant or colossal magnetoresistive structure located adjacent the oscillator coil, the structure having an imaginary magnetic susceptibility which is strongly dependent upon the magnitude and direction of the field generated by or at the object to be sensed.

51 Claims, 4 Drawing Sheets

U.S. PATENT DOCUMENTS

| | | | | |
|---|---|---|---|---|
| 5,670,886 | A | * 9/1997 | Wolff et al. | 324/644 |
| 5,834,709 | A | * 11/1998 | Blonder et al. | 178/18.05 |
| 5,841,621 | A | 11/1998 | Dean et al. | |
| 6,323,641 | B1 | * 11/2001 | Allwine | 324/207.2 |
| 6,593,738 | B2 | * 7/2003 | Kesil et al. | 324/230 |
| 2003/0067310 | A1 | * 4/2003 | Blank | 324/690 |

FOREIGN PATENT DOCUMENTS

| | | | |
|---|---|---|---|
| GB | 2034479 A | | 6/1980 |
| GB | 2034483 A | | 6/1980 |
| GB | 2067295 A | * | 7/1981 |
| GB | 2222257 A | | 2/1990 |
| GB | 2333845 A | | 8/1999 |
| WO | WO 2004/004113 A1 | * | 1/2004 |

OTHER PUBLICATIONS

Mutabzija–R, "Comparative analysis of two types of marginal oscillators as detectors", Tehnika (Yugoslavia), vol. 41, No. 10, p. 1011–14, 1986. (abstract attached).*

Dai–Ming–Yuan, "The Wien–Robinson oscillator for metering small variations in capacities" Elektronik (West Germany), vol. 37, No. 9, p. 86–9, Apr. 1988. (abstract attached).*

UK Search Report GB 0006144.0, dated Jul. 8, 2000.

* cited by examiner

POSITION AND ELECTROMAGNETIC FIELD SENSOR

RELATED APPLICATIONS

This application is a National Stage application of PCT International Application No. PCT/GB01/01085 filed, Mar. 13, 2001.

BACKGROUND

This application relates to a sensor for detecting the position of an object and/or an electromagnetic field associated with that object.

SUMMARY

In embodiments of a first aspect of the present invention, there are provided a susceptibility sensor for detecting relative movement between an inhomogeneously-shaped object to be sensed and the sensor, comprising: an oscillator including a sensor electromagnetic field generator; and an output arranged to provide a signal which varies in dependence upon the change in the electrical properties of the said oscillator; the sensor being arranged such that relative movement between the object to be sensed and the means for generating the sensor electromagnetic field causes the electromagnetic field to be presented with a change in electric or magnetic susceptibility whereby at least one of the electrical properties of the said oscillator is altered.

Using variations in electric or magnetic susceptibility provides a number of advantages. Firstly, the object to be detected may be formed of a very wide range of materials, such as ferromagnets, non-ferromagnets, metals, and even insulators such as ceramics plastics material. Secondly, the sensor has a very high sensitivity, relative to previous motion sensors, and this sensitivity is independent of the speed at which the relative movement of the object and sensor takes place.

The means for generating the sensor electromagnetic field may generate an alternating current (a.c.) field, preferably at rf or microwave frequencies. The sensor electromagnetic field may be generated by a conductive coil arranged to pass an alternating current, or by a capacitor subjected to an alternating voltage.

In use, the sensor electromagnetic field is presented with a change in electric or magnetic susceptibility, which may cause a variation in electromagnetic energy losses within the oscillator.

The means for generating the sensor electromagnetic field may comprise a coil and a capacitative element which together form a resonant circuit. In that case, the output of the sensor may be arranged to provide a signal that varies in dependence upon a change in the resonant frequency of the resonant circuit, the change in the resonant frequency being occasioned by a change in the real part of the electric or magnetic susceptibility presented to the sensor electromagnetic field. Most preferably, the output then includes a frequency-to-voltage converter arranged to generate a substantially d.c. voltage which varies monotonically in dependence upon variations in resonant frequency of the resonant circuit.

It is preferable that the coil is non-planar. The use of a non-planar coil provides particular advantages such as the ability to focus the sensitive region, and to obtain a better spatial resolution.

Alternatively, the sensor output may provide a signal that varies in dependence upon a change in the quality factor (Q) of the resonant circuit, the change in the Q factor being occasioned by a change in the imaginary part of the electric or magnetic susceptibility presented to the sensor electromagnetic field. In that case, the output may include a detection stage arranged to generate a substantially d.c. voltage that varies monotonically with the amplitude of the a.c. voltage across at least a part of the resonant circuit.

The oscillator is preferably a self-oscillating, closed loop oscillator, such as a Robinson marginal oscillator, a Van der Pol marginal oscillator or any oscillator variant with intermediate characteristics. In the case of the Robinson marginal oscillator in particular, it is preferable that an oscillator loop and limiter detector is employed. This potentially allows operation from the uhf region to d.c., and is insensitive to amplitude noise.

The use of an oscillator loop together with a limiter detector is likewise particularly advantageous when the limiter detector includes Gallium Arsenide or High Electron Mobility Transistors. The use of such devices allows operation up to the $GH_z$ regime which in turn provide increased spatial resolution.

In a particularly preferred embodiment, the sensor of the invention is further capable of monitoring an object electromagnetic field associated with the object to be sensed. In that case, the sensor may further comprise a sensor element arranged in proximity of the means for generating the sensor electromagnetic field, the sensor element having an anisotropic electric or magnetic susceptibility, the sensor being further arranged such that the change in the magnitude or direction of the object electromagnetic field associated with the object to be sensed, as experienced by the sensor element, causes a change in the electric or magnetic susceptibility of the sensor element. Then, the sensor electromagnetic field experiences a change in electric or magnetic susceptibility which in turn causes the at least one electrical property of the oscillator to be altered.

Such a sensor may be constructed using a discrete sensor element, in close proximity to a microwave stripline or uhf tank circuit comprising coil and capacitor. Such a sensor is highly versatile, and can detect both changes in the electric or magnetic susceptibility of the object to be sensed, or changes in magnitude or direction of the object electromagnetic field associated with the object to be sensed, or both. The sensor itself requires no modification and the output can generate a signal regardless of which parameter of the object to be sensed is changing. If the object to be sensed is moving, but has no object electromagnetic field associated with it, then the sensor of the preferred embodiment effectively ignores the presence of the sensor element, whose electric or magnetic susceptibility remains constant in that case.

In an alternative construction, the sensor element may be formed as a thin film grown or otherwise formed upon a coil of the oscillator, which in that case may act as a stripline structure. Such construction is particularly advantageous when the oscillator has a resonant frequency in the microwave frequency region of the electromagnetic spectrum, and the sensor then acts as a microwave motion and/or magnetic field sensor.

Although there are particular advantages associated with a composite sensor having both a sensor element and means for generating a sensor electromagnetic field, allowing monitoring of both moving objects and objects having an electromagnetic field associated with them that changes with time, the sensor need not necessarily allow monitoring of moving objects. Thus, in accordance with a second aspect of the present invention, there is provided a susceptibility sensor for detecting an object electromagnetic field associated with an object to be sensed, comprising: an oscillator including means for generating a sensor electromagnetic field; a sensor element arranged in proximity with the means for generating the sensor electromagnetic field, the sensor element having an electric or magnetic susceptibility that varies with magnitude and/or direction of applied electromagnetic field; and an output arranged to provide a signal which varies in dependence upon the change in the electrical properties of the said oscillator; the sensor being arranged such that a change in the magnitude or direction of the object electromagnetic field associated with the object to be sensed, as experienced by the said sensor element, causes a change in the electric or magnetic susceptibility of the said sensor element, whereby the said sensor electromagnetic field experiences a changing electrical or magnetic susceptibility which in turn causes at least one electrical property of the oscillator to be altered.

The sensor element may be formed from a colossal magnetoresistive material, such as lanthanum strontium manganite (LSMO). Such a material has a non-linear magnetisation M (H). Such non-linearity occurs even at small magnetic fields, making the sensor highly sensitive without needing to be immediately adjacent to the source of the electromagnetic field to be sensed. Via the Kramers Kronig relationship, this implies that any material that exhibits a strong variation in imaginary magnetic susceptibility with applied magnetic field is particularly suitable. In addition to LSMO, therefore, Permalloy could be used.

Although sensor elements that exhibit variations in imaginary magnetic susceptibility with applied magnetic fields are currently preferred, materials with variations in imaginary electric susceptibility as a function of applied electric fields could be employed instead or as well. Moreover, a material that exhibits variations in both electric and magnetic susceptibility would be particularly suitable.

Preferred features of the first aspect of the invention are equally preferred for the second aspect of the invention.

The susceptibility sensor of the invention is particularly suitable for sensing or monitoring certain objects. Accordingly, the present invention also provides, in combination, the susceptibility sensor of the first aspect of the invention, and an inhomogeneously-shaped object to sensed by the sensor, the inhomogeneously-shaped object causing the sensor electromagnetic field to be presented with a change in electrical or magnetic susceptibility as it is moved relative to the said sensor.

Preferably, the object to be sensed is rotationally inhomogeneous. For example, the object may have one or more spatially-projecting members, the position of the or each projecting member relative to the sensor at a given time defining the electric or magnetic susceptibility presented to the sensor electromagnetic field at that time. In other words, a region of space common to, or intermediate between, the sensor and the moving object has a varying electrical magnetic susceptibility by virtue of its being invaded by a portion of the moving object whose motion is being sensed.

The object to be sensed may, most preferably, be a cam having one or more lobes, or a toothed wheel.

As previously, the object to be sensed may also include means for generating a second electromagnetic field. This may be attached to the object to be sensed, for example a small permanent magnet, or may be otherwise associated with it. The second electromagnetic field generated may be of constant amplitude, and in that case movement of the object relative to the sensor causes the electric or magnetic susceptibility of the sensor element to change. Alternatively, the second electromagnetic field may be of variable amplitude. For example, a small electromagnet located on or adjacent to the object to be sensed may switch on and off to indicate the status of the object to be sensed, and the sensor is then able to detect the changing magnetic field of the electromagnet on the object to be sensed via a change in the susceptibility of the sensor element of the sensor.

The invention also extends to a combination of the susceptibility sensor of the second aspect, and an object to be sensed, the object to be sensed having associated therewith means for generating an object electromagnetic field.

In yet a further aspect of the invention, there is provided a method of detecting relative movement between an inhomogeneously-shaped object to be sensed and a sensor, comprising: generating a sensor electromagnetic field via an oscillator, the oscillator having a plurality of electrical properties; moving the object relative to the sensor, such that the sensor electromagnetic field is presented with a change in electric or magnetic susceptibility, thus causing a change in the electrical properties of the oscillator means; and detecting the change in at least one of the said electrical properties.

A method of detecting an object electromagnetic field associated with an object to be sensed is also provided, the method comprising generating a sensor electromagnetic field via an oscillator, the oscillator having a plurality of electrical properties; generating an object electromagnetic field at or proximal the object to be sensed; varying the direction or magnitude of the said object electromagnetic field; and detecting changes in the direction or magnitude of the said object electromagnetic field by monitoring the change in the electric or magnetic susceptibility of a sensor element located proximal the said oscillator, and which has an anisotropic magnetic or electric susceptibility.

In summary, the present invention provides a sensor that detects position and motion of mechanical components, light beams, magnetic and electric fields and other entities, using measurement of variations in magnetic and/or electric susceptibility. These variations are consequent on some component or region of space in either the sensor assembly or the moving system or both having a magnetic and/or electric susceptibility which has either a real or an imaginary component (or both) whose value is modulated by the mechanical (or other) motion being detected.

BRIEF DESCRIPTION OF THE DRAWINGS

The invention may be put into practice in a number of ways, and some embodiments will now be described by way of example only and with reference to the accompanying Figures in which.

DETAILED DESCRIPTION

Figure 1:
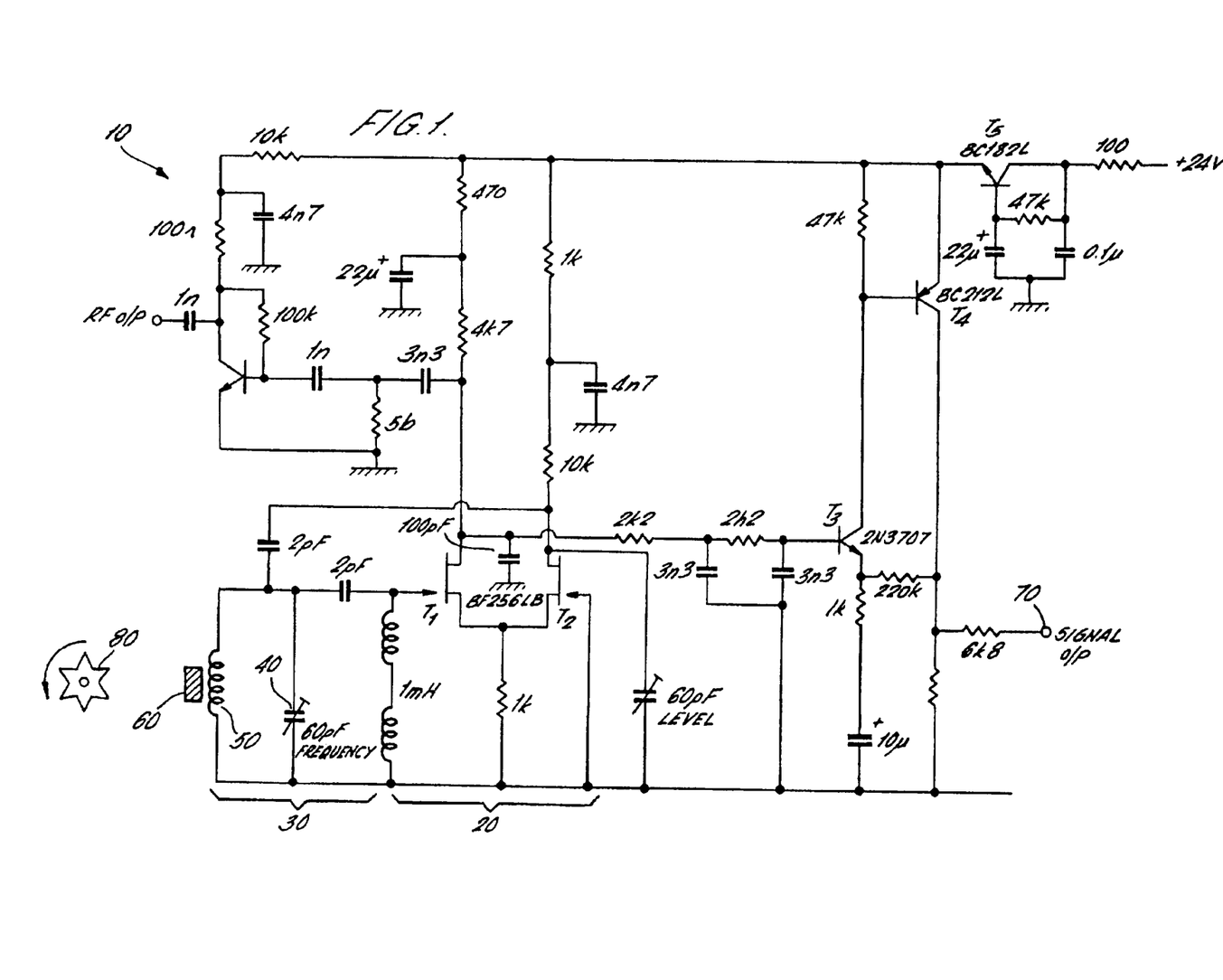
FIG. 1 shows a sensor according to a first embodiment of the present invention.

FIG. 1 shows a circuit diagram of a sensor according to a first embodiment of the invention. The circuit 10 comprises a closed loop Robinson-type oscillator 20 connected with a tank circuit 30. The tank circuit 30 comprises a capacitor and inductor provided by a variable capacitor 40 in parallel with a coil 50. The coil 50 is wrapped around a sensor element 60 and comprises a piece of colossal magnetoresistive material such as lanthanum strontium manganite (LSMO). This material has a strong variation in the imaginary part of its susceptibility, as a magnetic field applied to it varies.

In the circuit of FIG. 1, transistors T1 and T2 have a triple function. Firstly, they provide the gain to keep the closed loop Robinson oscillator 20 running, secondly they provide a limiting action which makes the feedback independent of amplitude noise, and thirdly they perform detection to generate an output signal. These three functions provided by transistors T1 and T2 may be separated out, as will be described in connection with FIG. 2 below.

The oscillator 20 operates at the resonant frequency of the tank circuit 30, defined by the inductance of the coil 50 and the capacitance of the variable capacitor 40. The amplitude of oscillation is a function of the electrical losses in the tank circuit 30. These in turn are a function of the susceptibility presented to the electromagnetic field generated by the coil 50, as explained below.

The rf amplitude is converted into a d.c. signal, and this is amplified by transistors T3 and T4 to give a circuit output 70. The transistors T5 and T6 act to smooth the power supply and to produce the frequency output respectively.

The sensor of FIG. 1 allows sensing in a variety of different ways, which will now be explained.

I. Variable Susceptibility of an Object to be Sensed

An object 80 to be sensed is located in the region of the coil 50 of the tank circuit 30. The object 80 shown in FIG. 1 is a toothed wheel. As the toothed wheel rotates, because it is rotationally inhomogeneous, the electromagnetic field generated by the coil 50 experiences a periodic variation in the electric or magnetic susceptibility (depending upon the material from which the toothed wheel is formed). In particular, a change in the imaginary magnetic susceptibility experienced by the electromagnetic field generated by the tank circuit 30, as a function of time, translates into rf losses in the coil 50. This in turn lowers the quality factor Q of the circuit 10, and the amplitude of the rf signal in the circuit changes as well. The changing rf amplitude is detected and converted into a changing d.c. voltage. The variation in susceptibility is related to the rotational speed and converts directly into a corresponding variation in the output voltage from the sensor.

Thus, the sensor of FIG. 1 will sense movement (in this case, rotation) of any object which presents a varying magnetic susceptibility to the electromagnetic field generated by the coil 50. This makes the sensor particularly advantageous, because it allows magnetic materials, non-magnetic materials, or metals to be monitored.

Although the object to be sensed 80 in FIG. 1 is a toothed wheel, it will be appreciated that an inhomogeneously-shaped object moving linearly past the coil 50 of the sensor will likewise present a change in susceptibility to the electromagnetic field generated thereby, which can be detected. Indeed, it is even possible to monitor a fixed, inhomogeneously-shaped object to be sensed, by for example providing an array of coils 50 at different locations, and switching between them, or by moving the sensor relative to a fixed object to be detected.

II. Detection of Magnetic Fields

In case I above, the change in electric or magnetic susceptibility is provided by the object to be sensed itself, which has an inhomogeneous shape and is moved relative to the sensor. In that case, the sensor element 60 is not a prerequisite of the circuit 10 as the movement of the object 80 itself (in the described embodiment) presents the changing electric or magnetic susceptibility to the field generated by the coil 50. However, because the sensor element 60 has a susceptibility which varies with direction and/or magnitude of applied magnetic field, a second mode of operation may also be provided by the same circuit.

In the second mode of operation, the object to be sensed 80 has attached thereto a source of an electromagnetic field. In the most straightforward form, this may simply be a small permanent magnet. As the object 80 moves relative to the sensor 10, the magnetic field generated by the permanent magnet, as experienced at the sensor element 60, changes. As previously explained, the imaginary part of the susceptibility of the sensor element 60 changes with applied magnetic field. The sensor element 60, being located proximal the coil 50, causes the electromagnetic field generated by the coil 50 to experience a changing magnetic susceptibility (specifically, a changing imaginary susceptibility), which causes the electromagnetic losses in the circuit 10 to occur, with the change in susceptibility instead being provided by the movement of the object 80 itself (example I above).

This second mode of operation is not restricted to measurement of a moving object 80. A change in the magnitude of the magnetic field generated at the object 80 will likewise be sensed by the sensor element 60. Therefore, a small electromagnet may be mounted upon or adjacent the object to be sensed. As the electromagnet switches on and off, this may be sensed by the sensor, by virtue of a changing susceptibility in the sensor element 60.

By a suitable choice of material for the sensor element 60, the sensor may have its sensitivity matched to whatever magnetic field range is required to be detected. For example, where it is simply desired to detect a change in magnetic field, and the magnitude of that change is not important, then a magnetic material with a sharp magnetic singularity would be chosen. Although this provides very high sensitivity, the sensor is not then optimised for quantitative measurements of magnetic field strength. By contrast, in order to measure the magnetic field strength quantitatively, the magnetic material selected for the sensor element 60 is chosen such that its magnetic characteristics vary smoothly over a wide magnetic field range. In this case, because the electronics driving the rf magnetic field generated by the coil 50 is self-oscillating and consists of a high frequency closed loop, the sensor outputs data not only as analog voltage, but also as a shift in the radio frequency. Since the latter is of the order of MHz, and can be measured to the order of a few Hz, the field detection sensor thus generated is extremely sensitive and in practice is limited in performance only by microphonic noise.

Figure 2:
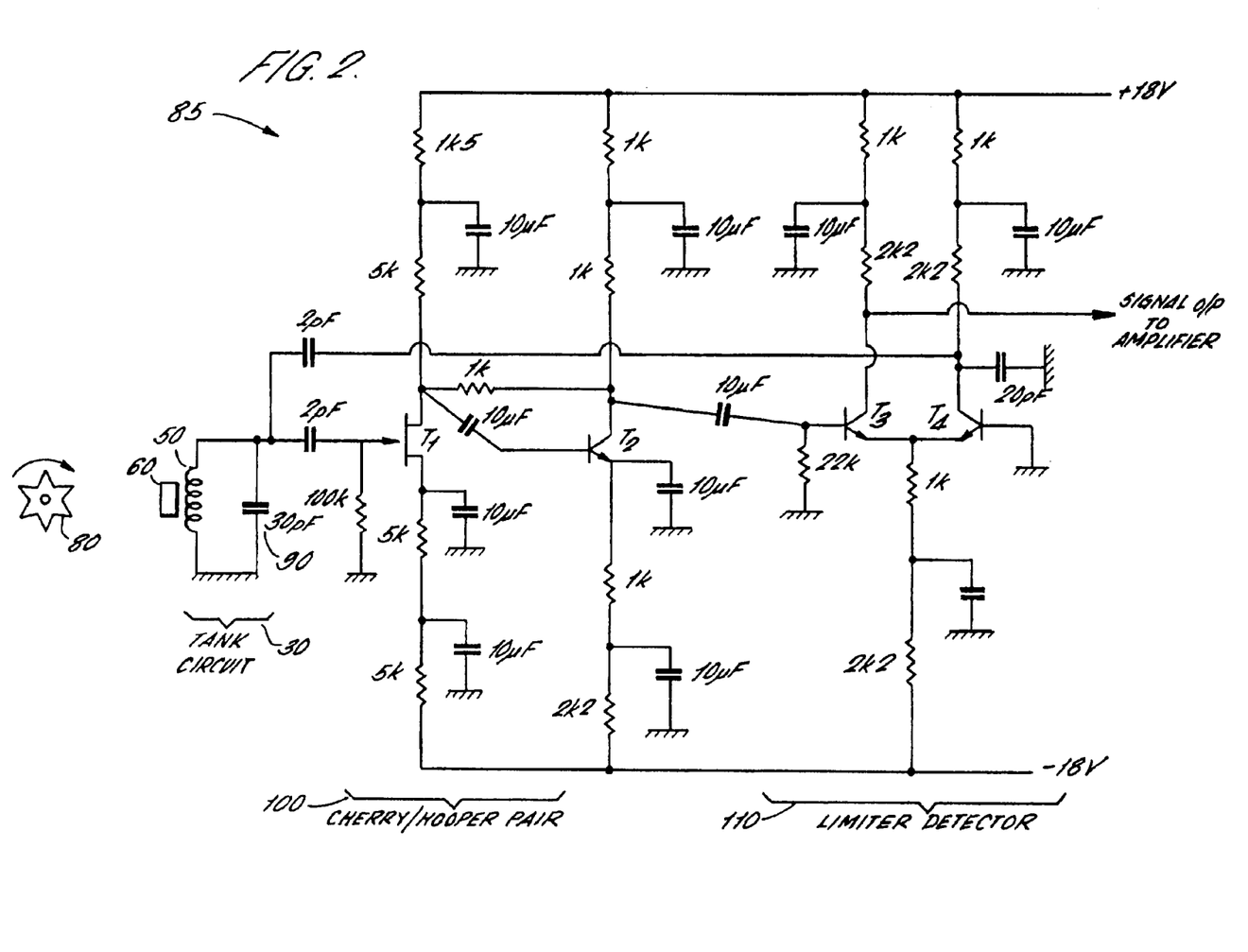
FIG. 2 shows a sensor according to a second embodiment of the present invention.

FIG. 2 shows a modified sensor 85 which offers more gain and resolved processing functions than the sensor 10 of FIG. 1. The tank circuit 30 of the modified sensor 85 in FIG. 2 includes a fixed capacitance 90 along with the coil 50 and the sensor element 60. The transistors T1 and T2, together with ancillary capacitors and resistors, form a Cherry/Hooper amplifier pair 100. The output of the Cherry/Hooper pair 100 is fed to a limiter and detector 110 formed from transistors T3 and T4 which act as a long tailed pair.

Figure 3:
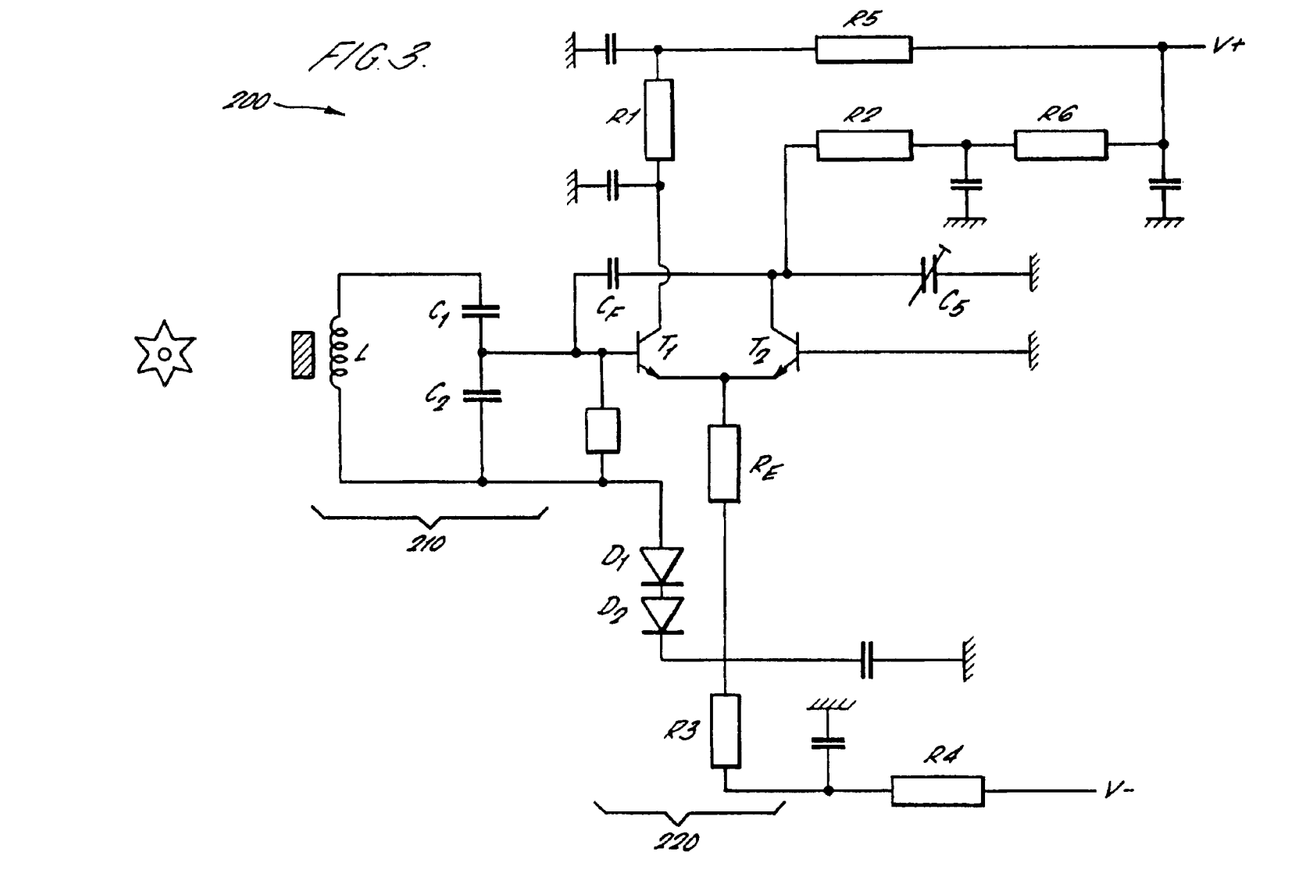
FIG. 3 shows a sensor according to a third embodiment of the present invention.

FIG. 3 shows yet another sensor arrangement 200 which provides an improved spatial resolution relative to the sensors of FIGS. 1 and 2. The sensor arrangement 200 again comprises a tank circuit 210 including a coil L and two capacitors $C_1$ and $C_2$. The tank circuit feeds a long tailed pair detector 220, similar to the sensor of FIG. 2. In contrast to the sensor of FIG. 2, however, the transistors $T_1$ and $T_2$ forming the long-tailed pair are GaAs FETs or High Electron Mobility Transistors (HEMTs). By employing such devices, the frequency of operation of the sensor arrangement 200 of FIG. 3 can be raised into the $GH_2$ regime, whilst preserving the high efficiency long-tailed pair detector configuration.

The typically low input impedance of III–V devices such as GaAs requires that the impedance of the tank circuit be transformed down. As the coil L is typically only a single loop of wire, this is achieved by capacitor tapping using the capacitors $C_1$ and $C_2$. A variable capacitor $C_5$ is also employed in the circuit of FIG. 3, to adjust the size of current pulse that is fed back. This in turn allows the amplitude of oscillation to be adjusted.

Two diodes D1 and D2 define a negative potential of −1.2V to which the emitter resistor is attached. because this 1.2 V potential is small relative to the voltage rail (typically +/−15 Volts, the emitter resistor is then 15/1.2 smaller which in turn improves the detector efficiency (proportional to the conductance of the emitter resistor) by 15/1.2 times.

A range of transistors are suitable for the long-tailed pair $T_1$ and $T_{21}$ such as BFE 505, BFE 520, BFG 505, BFG 520 or BFG 590.

Figure 4:
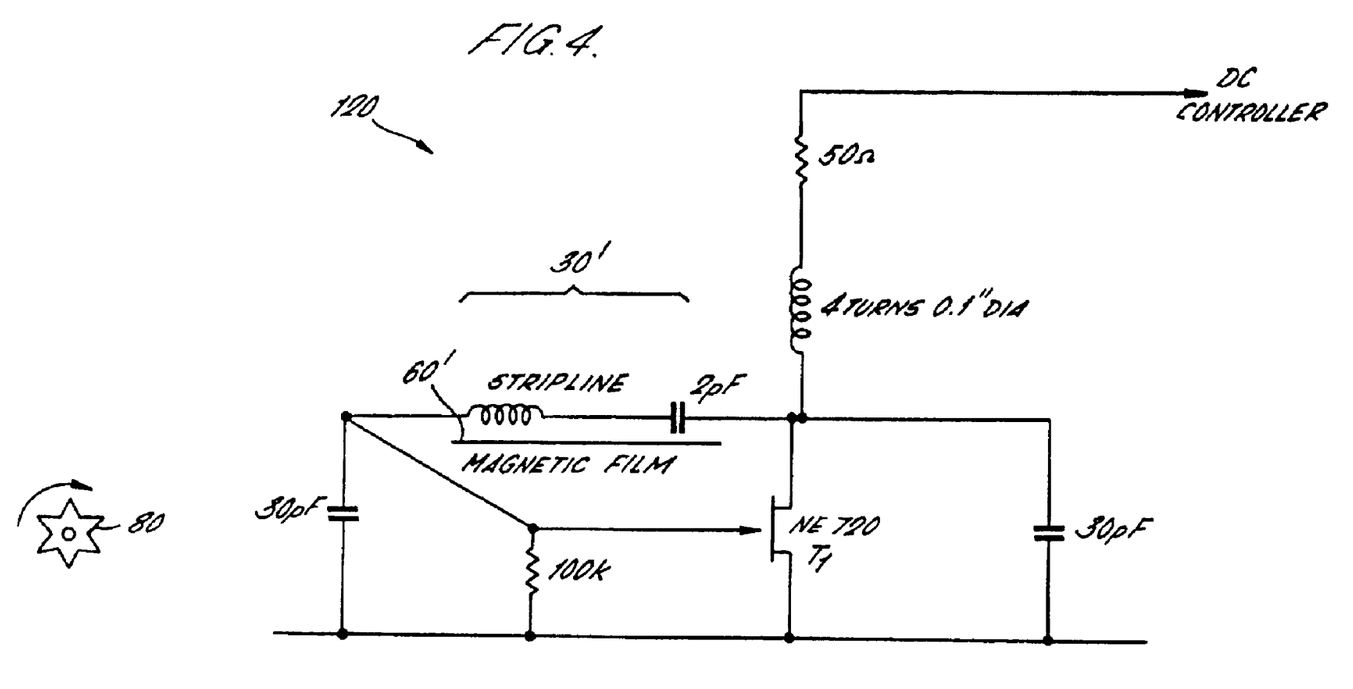
FIG. 4 shows a sensor according to a fourth embodiment of the present invention.

FIG. 4 shows a part of a sensor 120, which is particularly suitable for sensing an object 80 using microwave, rather than uhf frequencies. The components in FIGS. 1, 2 and 3 which constitute the oscillator, limiter and detector are compressed, in the sensor 120 of FIG. 4, into a single block represented by a microwave transistor T1. The tank circuit 30' of FIG. 4 is now more akin to a transmission line since the inductive and capacitive functions are less distinct at microwave frequencies. The sensor element 60' is a magnetic film grown onto the stripline of the tank circuit 30'. Changes in the susceptibility of the sensor element 60' cause the transistor T1 to operate on a different part of its characteristics and hence draw a different d.c. current. This d.c. current is converted to a variation in output voltage by associated control electronics (not shown).

The sensor described above in connection with FIGS. 1 to 4 is, as previously mentioned, extremely versatile in that it allows detection or monitoring (that is either quantitative or qualitative measurement) of inhomogeneously shaped objects formed from an extremely wide variety of materials. At the same time, using a sensor element having an electric and/or magnetic susceptibility that varies with direction and/or magnitude of applied magnetic field, within the sensor itself, qualitative and quantitative measurements in the magnitude and/or direction of a magnetic field at an object to be sensed can also be made. The shape of the sensor element is not important, except in so far as if it is too big, then the spatial resolution of the sensor is impaired. It is, however, helpful to arrange the resonant circuit so as to ensure maximum penetration of the electromagnetic field generated by the coil into the sensor element itself. This is one reason why it is particularly advantageous to grow the sensor element onto the coil itself.

The sensor described above has already been tested in the distributor of an internal combustion engine from a motor vehicle, the movement of the rotor relative to the sensor causing the susceptibility experienced by the sensor coil to change periodically as the rotor rotates. The sensor generates a signal which is capable of controlling the ignition timing. For this specific application, the sensor has proved to be highly advantageous in comparison with conventional sensors, because it can tolerate temperatures in excess of 1000° C. for long periods of time, and has an excellent signal-to-noise ratio, in practice limited only by microphonic noise. Moreover, the sensor has allowed "skipping" at low engine speeds to be eliminated and this has reduced hydrocarbon emissions from the internal combustion engine by a significant amount. Moreover, the sensor is capable of detecting movement in a rotor which is neither metallic nor magnetic. The sensor is also advantageous for this particular application because it is capable of producing a large output signal, independent of the rotor speed.

It will also be understood that the sensor can be manufactured very cheaply.

Other applications for the sensor include detection of plastics materials buried underground. In this case, the sensor needs to be moved relative to the buried plastics material. This may be carried out by mounting the sensor upon a probe and inserting this probe into the ground; during insertion, the sensor is then moving relative to the plastics material which causes a signal to be detected. As the output signal is independent of relative speed between the plastics material and the probe, the probe does not need to be inserted at a particular speed to successfully achieve detection. Alternatively, an array of sensors may be mounted on a fixed probe, the sensors being spatially separated from one another and then triggered sequentially.

Alternative applications are contemplated, such as the detection of plastics-based cables or pipes (e.g. fibre optics cables) or non-metallic utilities pipes. Furthermore, it is possible for the sensor to detect a flow of inhomogeneous fluids such as blood.

Using variations in electric or magnetic susceptibility provides a number of advantages. Firstly, the object to be detected may be formed of a very wide range of materials, such as ferromagnets, non-ferromagnets, metals, and even insulators such as ceramics or plastic materials. Secondly, the sensor has a very high sensitivity, relative to previous motion sensors, and this sensitivity is independent of the speed at which the relative movement of the object and sensor takes place.

The sensor electromagnetic field generator may generate an alternating current (a.c.) field, preferably at rf or microwave frequencies. The sensor electromagnetic field may be generated by a conductive coil arranged to pass an alternating current, or by a capacitor subjected to an alternating voltage.

In use, the sensor electromagnetic field is presented with a change in electric or magnetic susceptibility, which may cause a variation in electromagnetic energy losses within the oscillator.

The sensor electromagnetic field generator may comprise a coil and a capacitative element which together form a resonant circuit. In that case, the output of the sensor may be arranged to provide a signal that varies in dependence upon a change in the resonant frequency of the resonant circuit, the change in the resonant frequency being occasioned by a change in the real part of the electric or magnetic susceptibility presented to the sensor electromagnetic field. Most preferably, the output then includes a frequency-to-voltage converter arranged to generate a substantially d.c. voltage which varies monotonically in dependence upon variations in resonant frequency of the resonant circuit.

It is preferable that the coil is non-planar. The use of a non-planar coil provides particular advantages such as the ability to focus the sensitive region, and to obtain a better spatial resolution.

Alternatively, the sensor output may provide a signal that varies in dependence upon a change in the quality factor (Q) of the resonant circuit, the change in the Q factor being occasioned by a change in the imaginary part of the electric or magnetic susceptibility presented to the sensor electromagnetic field. In that case, the output may include a detection stage arranged to generate a substantially d.c. voltage that varies monotonically with the amplitude of the a.c. voltage across at least a part of the resonant circuit.

The oscillator is preferably a self-oscillating, closed loop oscillator, such as a Robinson marginal oscillator, a Van der Pol marginal oscillator or any oscillator variant with intermediate characteristics. In the case of the Robinson marginal oscillator in particular, it is preferable that an oscillator loop and limiter detector is employed. This potentially allows operation from the uhf region to d.c., and is insensitive to amplitude noise.

The use of an oscillator loop together with a limiter detector is likewise particularly advantageous when the limiter detector includes Gallium Arsenide or High Electron Mobility Transistors. The use of such devices allows operation up to the GHz regime which in turn provide increased spatial resolution.

In a particularly preferred embodiment, the sensor of the invention is further capable of monitoring an object electromagnetic field associated with the object to be sensed. In that case, the sensor may further comprise a sensor element arranged in proximity of the means for generating the sensor electromagnetic field, the sensor element having an anisotropic electric or magnetic susceptibility, the sensor being further arranged such that the change in the magnitude or direction of the object electromagnetic field associated with the object to be sensed, as experienced by the sensor element, causes a change in the electric or magnetic susceptibility of the sensor element. Then, the sensor electromagnetic field experiences a change in electric or magnetic susceptibility which in turn causes the at least one electrical property of the oscillator to be altered.

Such a sensor may be constructed using a discrete sensor element, in close proximity to a microwave stripline or uhf tank circuit comprising coil and capacitor. Such a sensor is highly versatile, and can detect both changes in the electric or magnetic susceptibility of the object to be sensed, or changes in magnitude or direction of the object electromagnetic field associated with the object to be sensed, or both. The sensor itself requires no modification and the output can generate a signal regardless of which parameter of the object to be sensed is changing. If the object to be sensed is moving, but has no object electromagnetic field associated with it, then the sensor of the preferred embodiment effectively ignores the presence of the sensor element, whose electric or magnetic susceptibility remains constant in that case.

In an alternative construction, the sensor element may be formed as a thin film grown or otherwise formed upon a coil of the oscillator, which in that case may act as a stripline structure. Such construction is particularly advantageous when the oscillator has a resonant frequency in the microwave frequency region of the electromagnetic spectrum, and the sensor then acts as a microwave motion and/or magnetic field sensor.

The sensor element may be formed from a colossal magnetoresistive material, such as lanthanum strontium manganite (LSMO). Such a material has a non-linear magnetisation M (H). Such non-linearity occurs even at small magnetic fields, making the sensor highly sensitive without needing to be immediately adjacent to the source of the electromagnetic field to be sensed. Via the Kramers Kronig relationship, this implies that any material that exhibits a strong variation in imaginary magnetic susceptibility with applied magnetic field is particularly suitable. In addition to LSMO, therefore, Permalloy could be used.

Although sensor elements that exhibit variations in imaginary magnetic susceptibility with applied magnetic fields are currently preferred, materials with variations in imaginary electric susceptibility as a function of applied electric fields could be employed instead or as well. Moreover, a material that exhibits variations in both electric and magnetic susceptibility would be particularly suitable.

Preferred features of the first aspect of the invention are equally preferred for the second aspect of the invention.

The susceptibility sensor of embodiments of aspects of the invention is particularly suitable for sensing or monitoring certain objects. Accordingly, embodiments of aspects of the present invention also provide in combination, the susceptibility sensor of the first aspect of the invention, and an inhomogeneously-shaped object to sensed by the sensor, the inhomogeneously-shaped object causing the sensor electromagnetic field to be presented with a change in electrical or magnetic susceptibility as it is moved relative to the said sensor.

Preferably, the object to be sensed is rotationally inhomogeneous. For example, the object may have one or more spatially-projecting members, the position of the or each projecting member relative to the sensor at a given time defining the electric or magnetic susceptibility presented to the sensor electromagnetic field at that time. In other words, a region of space common to, or intermediate between, the sensor and the moving object has a varying electrical magnetic susceptibility by virtue of its being invaded by a portion of the moving object whose motion is being sensed.

The object to be sensed may, most preferably, be a cam having one or more lobes, or a toothed wheel.

As previously, the object to be sensed may also include means for generating a second electromagnetic field. This may be attached to the object to be sensed, for example a small permanent magnet, or may be otherwise associated with it. The second electromagnetic field generated may be of constant amplitude, and in that case movement of the object relative to the sensor causes the electric or magnetic susceptibility of the sensor element to change. Alternatively, the second electromagnetic field may be of variable amplitude. For example, a small electromagnet located on or adjacent to the object to be sensed may switch on and off to indicate the status of the object to be sensed, and the sensor is then able to detect the changing magnetic field of the electromagnet on the object to be sensed via a change in the susceptibility of the sensor element of the sensor.

Embodiments of the invention also extend to a combination of the susceptibility sensor of the second aspect, and an object to be sensed, the object to be sensed having associated therewith means for generating an object electromagnetic field.

In yet a further aspect of the invention, there is provided a method of detecting relative movement between an inhomogeneously-shaped object to be sensed and a sensor, comprising: generating a sensor electromagnetic field via an oscillator, the oscillator having a plurality of electrical properties; moving the object relative to the sensor, such that the sensor electromagnetic field is presented with a change in electric or magnetic susceptibility, thus causing a change in the electrical properties of the oscillator means; and detecting the change in at least one of the said electrical properties.

In summary, embodiments of the present invention can include a sensor that detects position and motion of mechanical components, light beams, magnetic and electric fields and other entities, using measurement of variations in magnetic and/or electric susceptibility. These variations are consequent on some component or region of space in either the sensor assembly or the moving system or both having a magnetic and/or electric susceptibility which has either a real or an imaginary component (or both) whose value is modulated by the mechanical (or other) motion being detected.

Having understood the principles of the present invention, other applications will be apparent to the skilled reader.

What is claimed is:

1. A susceptibility sensor for detecting relative movement between an object to be sensed and the sensor, comprising:
   an oscillator including a sensor electromagnetic field generator, the oscillator having plural electrical properties; and
   an output arranged to provide a signal which varies in dependence upon in at least one of the electrical properties of the said oscillator as a result in changes in electric or magnetic susceptibility;
   wherein the oscillator is a Robinson marginal oscillator.

2. The susceptibility sensor of claim 1, in which the sensor electromagnetic field generator is adapted to generate an alternating current (ac) field.

3. The susceptibility sensor of claim 1, in which the sensor electromagnetic field generator comprises a conductive coil arranged to pass an alternating current.

4. The susceptibility sensor of claim 1, in which the sensor electromagnetic field generator comprises a capacitor subjected to an alternating voltage.

5. The susceptibility sensor of claim 1, in which, in use, the sensor electromagnetic field being presented with a change in electrical or magnetic susceptibility causes a variation in electromagnetic energy losses within the oscillator.

6. The susceptibility sensor of claim 1, in which the sensor electromagnetic field generator comprises a coil and a capacitative element which together form a resonant circuit.

7. The susceptibility sensor of claim 6, in which the coil is non-planar.

8. The susceptibility sensor of claim 6, in which the output is arranged to provide a signal that varies in dependence upon a change in the resonant frequency of the resonant circuit, the change in the resonant frequency being occasioned by a change in the real part of the electric or magnetic susceptibility presented to the sensor electromagnetic field.

9. The susceptibility sensor of claim 8, in which the output includes a frequency to voltage converter arranged to generate a substantially d.c. voltage which varies monotonically in dependence upon variations in resonant frequency of the said resonant circuit.

10. The susceptibility sensor of claim 6, in which the output is arranged to provide a signal that varies in dependence upon a change in the quality factor (Q) of the resonant circuit, the change in the Q factor being occasioned by a change in the imaginary part of the electrical or magnetic susceptibility presented to the sensor electromagnetic field.

11. The susceptibility sensor of claim 10, in which the output includes a detection stage arranged to generate a substantially d.c. voltage that varies monotonically with the amplitude of the a.c. voltage across at least a part of the resonant circuit.

12. The susceptibility sensor of claim 1, in which the oscillator is a self-oscillating, closed loop oscillator.

13. The susceptibility sensor of claim 11, in which the oscillator is a Robinson marginal oscillator comprising an oscillator loop and a limiter detector.

14. A susceptibility sensor for detecting an object electromagnetic field associated with an object to be sensed, comprising:
   an oscillator including means for generating a sensor electromagnetic field;
   a sensor element arranged in proximity with the means for generating the sensor electromagnetic field, the sensor element having an electric or magnetic susceptibility that varies as a function of the magnitude and/or direction of an applied electromagnetic field; and
   an output arranged to provide a signal which varies in dependence upon the change in the electrical properties of the said oscillator;
   the sensor being arranged such that a change in the magnitude or direction of the object electromagnetic field associated with the object to be sensed, as experienced by the said sensor element, causes a change in the electric or magnetic susceptibility of the said sensor element, whereby the said sensor electromagnetic field experiences a changing electric or magnetic susceptibility which in turn causes at least one electrical property of the oscillator to be altered;
   wherein the oscillator is a Robinson marginal oscillator.

15. The susceptibility sensor of claim 14, in which the means for generating the sensor electromagnetic field is adapted to generate an alternating current (a.c.) field.

16. The susceptibility sensor of claim 14, in which the means for generating the sensor electromagnetic field comprises a conductive coil arranged to pass an alternating current.

17. The susceptibility sensor of claim 14, in which the means for generating the sensor electromagnetic field comprises a capacitor subjected to an alternating voltage.

18. The susceptibility sensor of claim 14, in which, in use, the sensor electromagnetic field that is being presented with a change in electric or magnetic susceptibility causes a variation in electromagnetic energy losses within the oscillator.

19. The susceptibility sensor of claim 14, in which the means for generating the sensor electromagnetic field comprises a coil and a capacitative element which together form a tank circuit.

20. The susceptibility sensor of claim 19, in which the coil is non-planar.

21. The susceptibility sensor of claim 19, in which the output is arranged to provide a signal that varies in dependence upon a change in the resonant frequency of the resonant circuit, the change in the resonant frequency being occasioned by a change in the real part of the electric or magnetic susceptibility presented to the sensor electromagnetic field.

22. The susceptibility sensor of claim 21, in which the output includes a frequency to voltage converter arranged to generate a substantially d.c. voltage which varies monotonically in dependence upon variations in resonant frequency of the said resonant circuit.

23. The susceptibility sensor of claim 19, in which the output is arranged to provide a signal that varies in dependence upon a change in the quality factor (Q) of the resonant circuit, the change in the Q factor being occasioned by a change in the imaginary part of the electric or magnetic susceptibility presented to the sensor electromagnetic field.

24. The susceptibility sensor of claim 23, in which the output includes a detection stage arranged to generate a substantially d.c. voltage that varies monotonically with the amplitude of the a.c. voltage across at least a part of the resonant circuit.

25. The susceptibility sensor of claim 14, in which the oscillator is a self-oscillating, closed loop oscillator.

26. The susceptibility sensor of claim 24, in which the oscillator is a Robinson marginal oscillator comprising an oscillator loop and a limiter detector.

27. The susceptibility sensor of claim 14, in which the sensor element is formed from a colossal magnetoresistive material.

28. The susceptibility sensor of claim 27, in which the colossal magnetoresistive material is lanthanum strontium manganite (LSMO).

29. The susceptibility sensor of claim 18, in which the sensor element is formed as a discrete component, the coil being arranged such that its associated electromagnetic field intersects at least a part of the said sensor element.

30. The susceptibility sensor of claim 29, comprising a power supply arranged to supply a radio frequency (rf) signal to the tank circuit.

31. A susceptibility sensor arrangement, comprising:
a susceptibility sensor for detecting relative movement between an inhomogeneously-shaped object to be sensed and the sensor, said susceptibility sensor comprising:
an oscillator including a sensor electromagnetic field generator, the oscillator having electrical properties; and
an output arranged to provide a signal which varies in dependence upon a change in at least one of electrical properties of the oscillator;
the sensor being arranged such that relative movement between the object to be sensed and the sensor electromagnetic field generator causes an electromagnetic field generated by the electromagnetic field generator to be presented with a change in electric or magnetic susceptibility whereby at least one of the electrical properties of said oscillator is altered;
the arrangement further comprising:
the inhomogeneously-shaped object causing the sensor electromagnetic field to be presented with a change in electric or magnetic susceptibility as it is moved relative to the said sensor;
wherein the oscillator is a Robinson marginal oscillator.

32. The susceptibility sensor arrangement of claim 31, in which the object to be sensed is rotationally inhomogeneous.

33. The susceptibility sensor arrangement of claim 32, in which the object to be sensed has at least one spatially projecting member, the position of the or each projecting member relative to the sensor at a given time defining the electrical or magnetic susceptibility presented to the sensor electromagnetic field at that time.

34. The susceptibility sensor arrangement of claim 33, in which the object to be sensed is a toothed wheel.

35. The susceptibility sensor arrangement of claim 31, in which the inhomogeneously-shaped object to be sensed is formed from a ferromagnetic, a non-ferromagnetic, a metal or a plastics material.

36. The susceptibility sensor arrangement of claim 31, in which an object electromagnetic field generator producing an object electromagnetic field of constant amplitude is attached to the object to be sensed, movement of the said object relative to the sensor causing the said change in the electric or magnetic susceptibility of the said sensor element.

37. The susceptibility sensor arrangement of claim 31, in which an object electromagnetic field generator producing an electromagnetic field of variable amplitude is attached to the object to be sensed, the change in amplitude of the electromagnetic field of variable amplitude causing the said change in the at least one of the electric and magnetic susceptibility of the said sensor element.

38. In combination, the susceptibility sensor of claim 13, and an object to be sensed, the object to be sensed having associated therewith an object electromagnetic field generator.

39. A susceptibility sensor arrangement, comprising:
a susceptibility sensor for detecting relative movement between an inhomogeneously-shaped object to be sensed and the sensor, said susceptibility sensor comprising:
an oscillator including means for generating a sensor electromagnetic field; and
an output arranged to provide a signal which varies in dependence upon a change in the electrical properties of the said oscillator;
the sensor being arranged such that relative movement between the object to be sensed and the means for generating the sensor electromagnetic field causes the electromagnetic field to be presented with a change in electric or magnetic susceptibility whereby at least one of the electrical properties of the said oscillator is altered;
the arrangement further comprising:
a means for generating an object electromagnetic field, where the means for generating an object electromagnetic field is attached to the object to be sensed and, in use, generates an object electromagnetic field of constant amplitude, the movement of the said object relative to the sensor causing the said change in the electric or magnetic susceptibility of the said sensor element;
wherein the oscillator is a Robinson marginal oscillator.

40. The combination of claim 38, which the object electromagnetic field generator generates, in use, an object electromagnetic field of variable amplitude, the change in the said amplitude of the object electromagnetic field causing the said change in the electric or magnetic susceptibility of the said sensor element.

41. A method of detecting relative movement between an inhomogeneously-shaped object to be sensed and a sensor, comprising:
generating a sensor electromagnetic field via a Robinson marginal oscillator, the Robinson marginal oscillator having a plurality of electrical properties;
moving the object relative to the sensor, such that the sensor electromagnetic field is presented with a change in electric or magnetic susceptibility, thus causing a change in the electrical properties of the oscillator means; and
detecting the change in at least one of the said electrical properties.

42. The method of claim 41, in which the object to be sensed is rotationally inhomogeneous, the method further comprising rotating the object relative to the sensor.

43. The method of claim 41, in which detecting the change in at least one of the said electrical properties comprises measuring the change in electromagnetic losses in the said Robinson marginal oscillator as the inhomogeneously-shaped object moves relative to the sensor.

44. The method of claim 43, in which measuring the change in electromagnetic losses in the oscillator comprises measuring the variation in the quality factor of the oscillator.

45. The method of claim 43, in which measuring the electromagnetic losses in the Robinson marginal oscillator comprises measuring the variation in the resonant frequency of the oscillator.

46. The method of claim 41, in which the oscillator comprises a coil and a capacitance, the method further comprising exciting the Robinson marginal oscillator at its resonant frequency, and detecting changes in the said resonant frequency.

47. The method of claim 46, in which detecting comprises converting the change in frequency into a change in voltage, and generating a substantially d.c. voltage.

48. The method of claim 41, in which the oscillator comprises a coil and a capacitance, the method further comprising exciting the Robinson marginal oscillator at its resonant frequency, and detecting changes in the quality (Q) factor of the oscillator.

49. The method of claim 38, in which detecting comprises converting the amplitude of the a.c. voltage across at least a part of the oscillator into a substantially d.c. voltage.

50. The method of claim 41, further comprising:
   generating an object electromagnetic field at or proximal the object to be sensed; and
   detecting changes in the direction or magnitude of the said object electromagnetic field by monitoring a change in the electric or magnetic susceptibility of a sensor element located proximal the said oscillator and having a magnetic or electric susceptibility that changes as a function of the magnitude and/or direction of applied magnetic field, such that the said sensor element causes the said change in the at least one of the said electrical properties of the oscillator as the direction or magnitude of the said object electromagnetic field changes;
   whereby the method permits sensing of both movement of the inhomogeneously-shaped object as well as changes in the object electromagnetic field generated at or proximal to it.

51. A method of detecting an object electromagnetic field associated with an object to be sensed, comprising:
   generating a sensor electromagnetic field via a Robinson marginal oscillator, the Robinson marginal oscillator having a plurality of electrical properties;
   generating an object electromagnetic field at or proximal the object to be sensed;
   varying the direction or magnitude of the said object electromagnetic field; and
   detecting changes in the direction or magnitude of the said object electromagnetic field by monitoring the change in the electric or magnetic susceptibility of a sensor element located proximal the said oscillator, and which has a magnetic or electric susceptibility that varies as a function of the change in magnitude and/or direction of applied magnetic field.

* * * * *